(12) United States Patent
Sakib

(10) Patent No.: US 12,005,362 B2
(45) Date of Patent: Jun. 11, 2024

(54) SYSTEM, METHOD AND MULTI-FEATURED COMPUTER PROGRAM PRODUCT FOR VIDEO CREATION

(71) Applicant: Shadman Sakib, Walnut, CA (US)

(72) Inventor: Shadman Sakib, Walnut, CA (US)

( * ) Notice: Subject to any disclaimer, the term of this patent is extended or adjusted under 35 U.S.C. 154(b) by 0 days.

(21) Appl. No.: 17/006,927

(22) Filed: Aug. 31, 2020

(65) Prior Publication Data

US 2022/0062776 A1    Mar. 3, 2022

(51) Int. Cl.
| | | |
|---|---|---|
| *A63F 13/87* | (2014.01) |
| *A63F 13/213* | (2014.01) |
| *A63F 13/822* | (2014.01) |
| *A63F 13/86* | (2014.01) |
| *G06F 3/16* | (2006.01) |
| *G06V 40/20* | (2022.01) |
| *G10H 1/00* | (2006.01) |
| *G11B 27/031* | (2006.01) |
| *H04N 5/77* | (2006.01) |
| *H04N 23/60* | (2023.01) |
| *G06F 3/04842* | (2022.01) |

(52) U.S. Cl.
CPC .......... *A63F 13/822* (2014.09); *A63F 13/213* (2014.09); *A63F 13/86* (2014.09); *G06F 3/165* (2013.01); *G06V 40/20* (2022.01); *G10H 1/0008* (2013.01); *G11B 27/031* (2013.01); *H04N 5/77* (2013.01); *H04N 23/60* (2023.01); *G06F 3/04842* (2013.01); *G10H 2210/071* (2013.01)

(58) Field of Classification Search
None
See application file for complete search history.

(56) References Cited

U.S. PATENT DOCUMENTS

| | | | |
|---|---|---|---|
| 9,919,215 B2 * | 3/2018 | DeCoufle | H04L 51/32 |
| 10,561,947 B1 * | 2/2020 | Johnston | A63F 13/70 |
| 2014/0011594 A1 * | 1/2014 | Diaz | G07F 17/32 463/42 |
| 2016/0096113 A1 * | 4/2016 | Decoufle | H04L 51/32 463/7 |
| 2017/0182411 A1 * | 6/2017 | Kim | A63F 13/33 |
| 2017/0185596 A1 * | 6/2017 | Spirer | H04N 21/475 |
| 2018/0001200 A1 * | 1/2018 | Tokgoz | A63F 13/52 |

* cited by examiner

*Primary Examiner* — Sunit Pandya

(57) ABSTRACT

A multi-functional computer implemented system for creation of videos with various effects is provided. The computer implemented system of present invention is comprising of: a guessing subsystem that allows user to create and share a video with guessing option for other users to play a guessing game while watching the video; a challenge subsystem to allow users to challenge other users for video battles; a tracking subsystem that allows user to select any specific segment of the video, determines music/audio effect present within that segment and visualizes that music effect in video too; and a gesture detection subsystem that is provided to detect the gesture of the user and perform action associated with detected gesture.

5 Claims, 5 Drawing Sheets

SYSTEM, METHOD AND MULTI-FEATURED COMPUTER PROGRAM PRODUCT FOR VIDEO CREATION

FIELD OF INVENTION

The present invention is a system, method and a computer program product for video gesture analysis and creative video editing. More particularly, it is a computer implemented system for entertainment that facilitates user to create videos with interesting features, detect gestures and add effects according to the gesture as well as to challenge other user of any cross linked platforms for a video battle.

BACKGROUND OF INVENTION

In today's day and age every human, every business is heavily dependent on visual media, be it for promotions, for concept pitches, to reach out to people, or just to create original content for entertainment. This is especially true when it comes to social media interactions, with millions of content based videos being uploaded every minute across the globe, the requirement of user-friendly, innovative and multi-faced video editing software in on the rise. To keep up with the demands of the time, there is a range of software for computers and apps for smartphones, built for beginners and engineered for experts, ranging from simple UI with easy trimming tools and export options to a suite of premium tools for feature films and polished videos. However, there is a dearth of smart interactive software which enable real-time customizations during the process of recording. There are gaming software which provide some level of customization of the video during the progression of the game, however, such level sophistication of interactive, smart software for video recording and editing is simply not achieved.

SUMMARY OF INVENTION

The present disclosure overcomes one or more shortcomings of the prior art and provide additional advantages discussed throughout the present disclosure. Additional features and advantages are realized through the techniques of the present disclosure. Other embodiments and aspects of the disclosure are described in detail herein and are considered a part of the claimed disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

In one non-limiting embodiment, the present invention provides a system, method and computer program product for adding various effects in videos by detecting gestures, adding gesture and filters to real time videos, creating videos with guessing, challenging others for the video battle by sharing created videos over any cross linked platforms, adding visualizer effect or tracking effect or auto tuning of videos, and music segmentation or music trimming.

According to one non-limiting embodiment, the computer implemented system is comprising of a gesture detention sub-system, a guessing sub-system, a voting and challenge sub-system to challenge other user's video, a tracking sub-system, and a music segmentation sub-system. The gesture detection system of present computer implemented system facilitates user to make or add effects by detecting gestures of the user and mapping said gesture with pre-defined effect. The gesture detection system consists of two parts; back end and front end. The back end system consists of three modules: (a) Camera Module (b) Detection Module and (c) interface Module. According to one embodiment, the guessing system uses camera of the smart user devices as an image detector for capturing input images or video and sending the said images or video to the detection module for processing in the form of frames. The detection module is a computer program product of present system that is responsible for image processing using pre-trained classified haar cascade xml to detect the gesture of the user within the received input video. While, the Interface module is responsible for mapping the detected gestures to their associated actions. These actions are then passed to the appropriate application. In one of the non-limiting embodiment, the system uses inbuilt webcam/Device Camera to recognize both static and dynamic gestures. Further the system is suitable to allow input from a USB based webcam/Device Camera as well.

According to one embodiment, the computer implemented system of present invention provides a guessing system that facilitates first user who is creating the video to add guessing option within the recorded video by putting a question related to video content with plurality of answers as options to which the second user viewing the video may answer and earn points, right answer gives a 10 points to the viewer while the wrong answer gives 0 points. The guessing system allows the first user to set a guessing option, set the time when guessing option should appear during the video. The guessing system provides 2 options to the viewers to guess. The system using user interface lets the first user to set question and answers. Under the other feature of the guessing system, the indicator of the video timeline show a guessing point where the user can guess or continue to watch by pressing on play button. If the second user guesses it right, the system credits 10 points to second user and wrong answer adds 0 points.

In yet another embodiment of the invention, the computer implemented system of present invention provide feature of VS challenge or video battle feature; wherein two users can challenge each other for a video competition. The system facilitates the first user to create a video content by accessing the platform of the present computer implemented system using the smart user device of the user and tagging a friend or any other second user of the platform for the challenge. The computer implemented system displays the challenge over the feed of the second user which is visible over the user interface of the smart device of the second user. After accepting the video challenge by the second user, the computer implemented system facilitates the second user to create a video content using the computer implemented platform of present invention and the camera of said smart device of second user for recording and creation of said video. The computer implemented system then allows second user to post that second video. The computer implemented system displays both the videos in VS mode or as a video battle to which viewer can vote and accordingly the system decides and declares the winner after pre-set amount of time.

In yet one more embodiment of the invention, the computer implemented system of present invention provides feature of tracking or that facilitates user to add a visualizer effects within the recorded video at any portion of the video. The system lets user to set the time where the tracking feature is applied and visualizes the same effect of audio in the recorded video. The system analyzes the video and audio and produces the modified video that shows the tracking effect based on the audio properties.

The computer implemented system provides a tracking system that by using camera of the smart user device, allows user to record a video and feed any audio or voice in that recorded video. The system then facilitates user to select any specific portion of said recorded video and apply tracking feature on that portion, which visualizes applied effects of audio of that said portion in video. For example, if the audio within said specific portion is in slow rhythm, the present system causes the video to be played in slow motion, or if there is a beats effect the system creates short duration blackout effect in video, or if there is a bass effect present within the audio track, the system causes video screen to shake according to bass etc. Thus, depending on the effect present within the audio, the system visualizes the effect accordingly in audio. The system analyzes the music and updated the user interface based on bass, beats and motion.

In another embodiment of the invention, the system updates user interface by changing the color intensity of the video filter and the tracking system produces a modified video that will be on the video player.

According to one another embodiment, the music segmentation subsystem is provided to facilitate the user with a feature of creation of music segments and music trimming. The music segmentation subsystem allows user to select a music from the list provided by the system, create a complete video with multiple video segments attached with the selected music and trim each music segment from the video.

Other aspects, advantages and salient features of the invention will become apparent to those skilled in the art from the following detailed description, which details the invention in different embodiments.

BRIEF DESCRIPTION OF DRAWINGS

The foregoing summary, as tell as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF INVENTION

Figure 1:
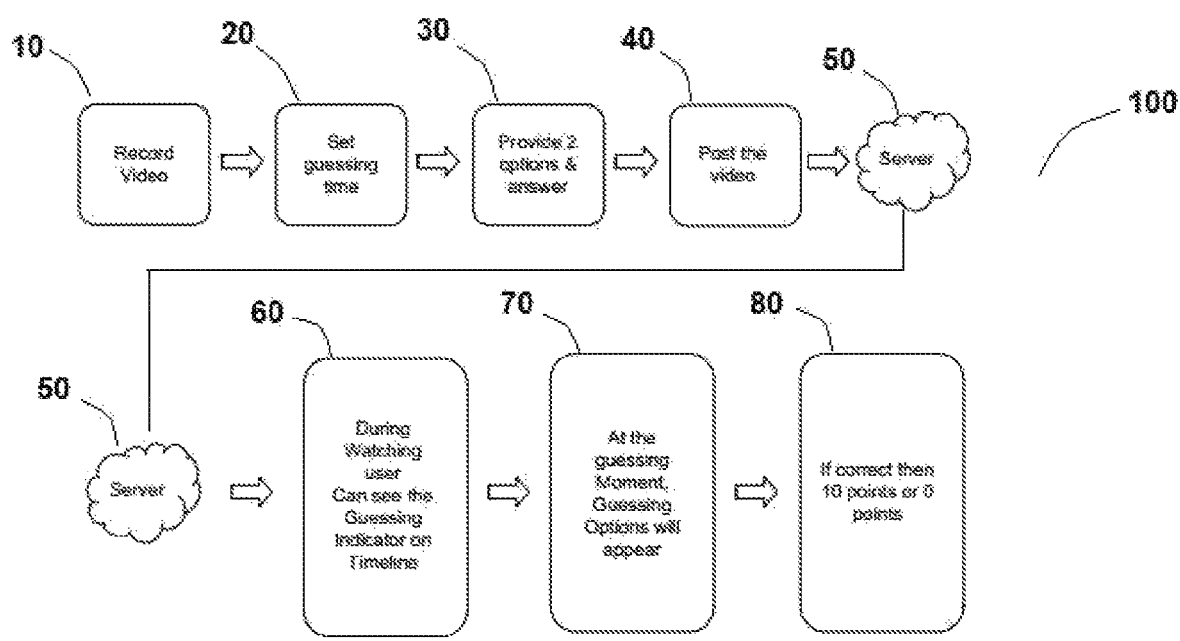
FIG. 1 shows process or work flow diagram of the guessing sub-system of present computer implemented system for user to create video with guessing feature and play the guessing game.

The present invention overcomes the aforesaid drawbacks of the above, and other objects, features and advantages of the present invention will now be described in greater detail. Also, the following description includes various specific details and are to be regarded as merely exemplary. Accordingly, those of ordinary skill in the art will recognize that: without departing from the scope and spirit of the present disclosure and its various embodiments there may be any number of changes and modifications described herein.

The present invention provides a computer implemented system, method and computer program product having a guessing subsystem that facilitate users to edit video and play guessing game with other users of the system; a challenge subsystem to allow user to challenge any other users of the system for a video battle, by creating and sharing creatively edited videos over any cross linked platforms; a tracking subsystem to determine audio effect such as slow rhythm, beats effect, bass effect etc. present at any segment of the recorded video and to provide visualization of said audio effect in said video segment based on the audio properties; and a gesture detection subsystem that is provided to recognize gesture of the user, map that gesture and accordingly provides an associated action with the gesture.

Guessing Subsystem

According to one embodiment, the guessing subsystem of present computer implemented system provides a guessing feature for the user of the present computer in implemented system and platform or user of any other cross linked platform. The guessing subsystem allows the first user to access the present computer implemented system using the personal smart device and create a video using the camera of the smart user device. The guessing subsystem of present computer implemented system includes a guessing button which the first user may access using the touch user interface (UI) of the smart user device. As soon as the first user click on the guessing button, the computer implemented system of present invention initiates the camera of the smart user device to record a video. After recording of segment of the video, the guessing subsystem allows first user to set the guessing question with at least two optional answers for other users to guess, and set time for the guessing question to appear during the video. Once the video is created with guessing question, option and time, the computer implemented system of present invention allows user to post said video over any cross linked platforms where other viewers or users of said platform may view and play the guessing game.

The computer implemented system of present invention displays said posted video over the feeds of all the connected users over the platforms. The system displays said video with an indicator of guessing option so that the viewers may know about the guessing feature associated with the video before they play said video. The system further allows user to play the guessing game by answering the question or skip the guessing game and just watch the video. The system further provides points for the correct guessing, if the viewer answers the questing correctly.

FIG. 1 shows process or work flow diagram of the guessing sub-system 100 of present computer implemented system for user to create video with guessing feature and play the guessing game with other users of any cross linked platform. According to present embodiment, the guessing subsystem 100 facilitates user to access the subsystem 100 by accessing computer implemented system using any smart user device. The smart user device is any network enables user device capable of accessing the present computer implemented system and a system server such as smartphone, laptop, computer or any other smart device.

The computer implemented system allows the first user to access the guessing subsystem which includes a guessing button to allow user to create a video with a guessing feature. Once the first user presses the guessing button, the guessing subsystem 100 activates the camera of the smart user device to record a video 10. After creation of video, the guessing subsystem facilitates the first user to: set guessing time 20 or time when guessing question should appear to viewers during the video; insert guessing question with at least two optional answers 30; and post 40 said video over the computer implemented system that further stores said video over the server 50.

The system then displays said video along with the guessing indicator 60 over the profiles or feeds of all the connected users of the first user on any cross linked platform said video from the server 50. While watching said video, the system freezes the video and displays the guessing question with an options at the guessing moment 70 to which user may answer and get point 80, if the answer is correct.

Challenge Subsystem

The challenge subsystem of present computer implemented system facilitates the users of the platform or the system to compete or challenge for a video battle. The subsystem allows the first user to create a video using the computer implemented system and tag other friends or users of the platform for video battle. Once the first user tags the other users, the system notifies all the tagged users about the challenge to which they may accept or reject. If the second user accepts the challenge, the challenge subsystem allows the second user to create his own video using the computer implemented system and camera of his/her personal smart user device. Once the video of the second user is created, the system stores both the videos over the server as well as display both the videos over the feeds of other users of the platform in form of VS mode or as a video battle. The challenge subsystem of the present computer implemented system allows other users or viewers to rate both the videos and decide the winner accordingly after a preset amount of time.

Figure 2:
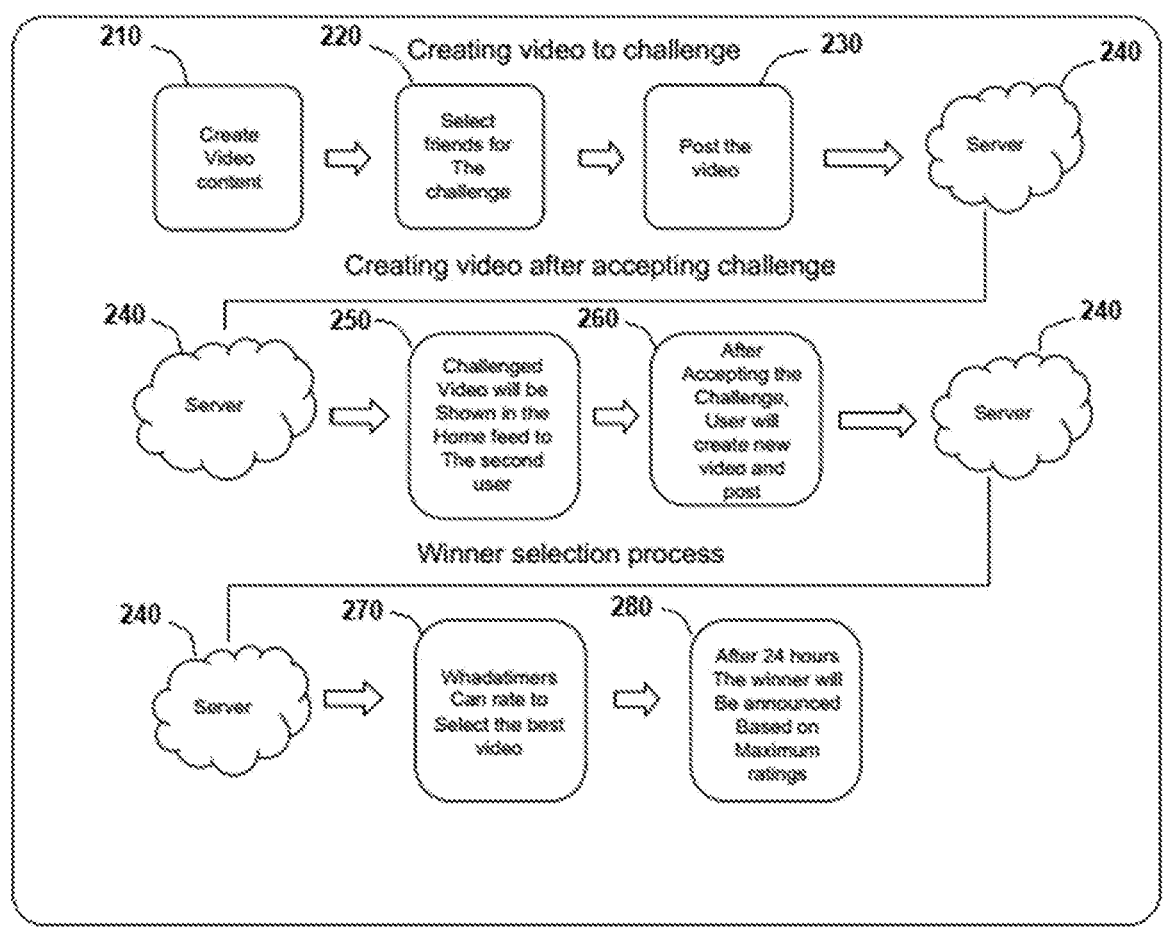
FIG. 2 shows flow diagram of challenge subsystem of present computer implemented system that facilitates video battle between two users and determines winner based on the ratings.

Referring to FIG. 2 which shows flow diagram of challenge subsystem 200 of present computer implemented system that facilitates video battle between two users and determines winner based on the ratings given by the viewers. According to present embodiment, the challenge subsystem is capable of being accessed by the user by accessing the computer implemented system of present invention using the smart device of user. The challenge subsystem 200 of present invention includes a challenge button to allow user to click and start a video battle. Once the first user accesses the challenge subsystem 200 and presses challenge button, the challenge subsystem 200 starts camera of the smart user device and initiates creation of a video content 210. The challenge subsystem 200 then allows first user to select and tag friends or other users of the system for the challenge or video battle, and post video 230 of the first user over the challenge subsystem 200 to which the subsystem 200 stores over the server 240.

The computer implemented system of present invention then notifies the second user about the challenge and displays video of the first user over the home feed of the second user 250 to which the second user may accept or reject. If the second user accepts the challenge, the computer implemented system allows the second user to access the challenge subsystem 200, create a second video and post the same 260 over the computer implemented system which the system stores over the server 240 as well as displays both the videos over the home feeds of the other users of the system so that they may watch both the videos of first user and second user and rate 270 the videos. The system, after pre-defined time of starting of battle, announces winner of the battle 280 based on the ratings of the viewers.

Tracking Subsystem

Figure 3:
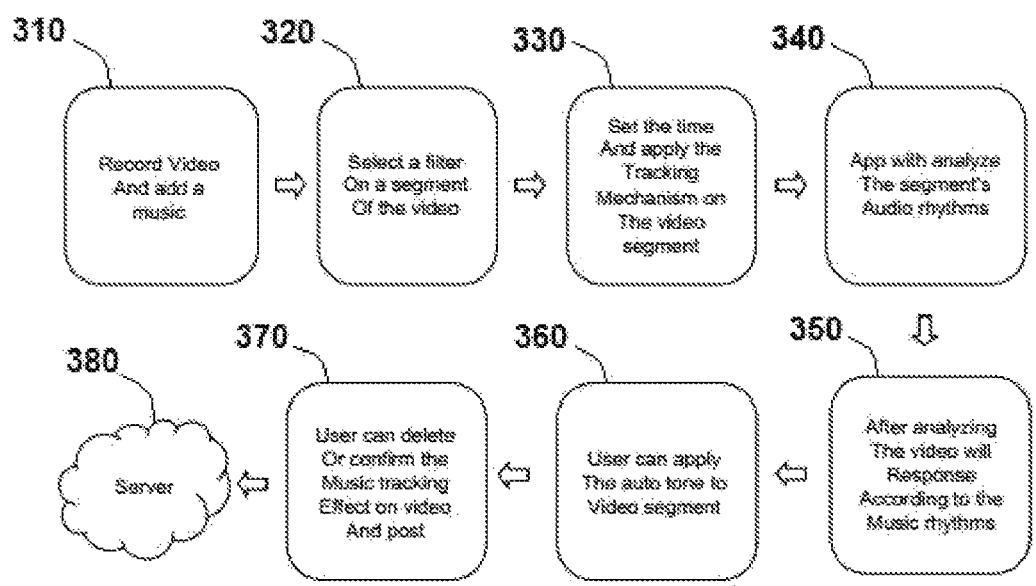
FIG. 3 process flow diagram of working of tracking subsystem for creation of video with visualization of effects present in audio.

The tracking subsystem is provided to allow the users to add tracking effect in the videos. The tracking subsystem of present computer implemented system visualizes video with already applied filters on the audio. Referring to FIG. 3 that shows a process flow diagram of working of tracking subsystem 300 for creation of video with visualization of effects present in audio. The tracking subsystem 300 of present computer implemented system allows the user to record the video and add music/audio within the video 310; allows the user to select a filter on a segment of the video 320; and allows the user to set the time and apply the tracking mechanism of the tracking subsystem on said selected video segment 330. The tracking subsystem 300 of present computer implemented system then analyzes the selected segment's audio rhythm 340 and visualizes that segment of the video according to the music rhythm 350. For instance, if the music in said video segment is slow rhythm, the system also plays the video in slow motion; If there is a beats effect present in the music, the system creates a short duration blackout effect in video; or if there is a bass effect, the system shakes video screen based on the bass.

According to one embodiment, the tracking subsystem further allows user to apply auto tone to the video segment 360. Once the effect is added in the segment of the video, the tracking subsystem allows user to confirm or delete the effect and post 370 said video over the computer implemented. The computer implemented system displays the video over the home feeds of the connected users and further stores said video over the server 380.

Gesture Detection Subsystem

The computer implemented system of present invention provides a gesture detection subsystem that detects the gesture of the user and performs pre-associated action with said gesture. For instance, the subsystem detects gestures such as, but not limited to, swipe, clap, kick or jump etc. and based on that detected gesture, visualizes the selected filter or effect associated with respective gesture. If the gesture detection subsystem detects the Swipe action, the subsystem causes the selected filter to follow the hand while the user is performing interactive. With detection of clap gesture of user, the filter appears from both sides of the screen and becomes one filter or the filter appears like a buzz causing screen to shake. When the subsystem detects a kick gesture, it visualizes a filter as if it is coming out of the leg; and for Jump gesture, the filter appears from the bottom of the screen. Further, the subsystem may detects any other possible gesture without any limitation and may visualize associated effect with said gesture.

According to one embodiment, the gesture detection subsystem consists of two parts: back end and front end. The back end determines the gesture and commands action associated with said action while the front end visualizes action associated with said gesture. The back end part of the gesture detection subsystem is made of three main modules: 1. Camera module, 2. Detection module and 3. Interface module.

Figure 4:
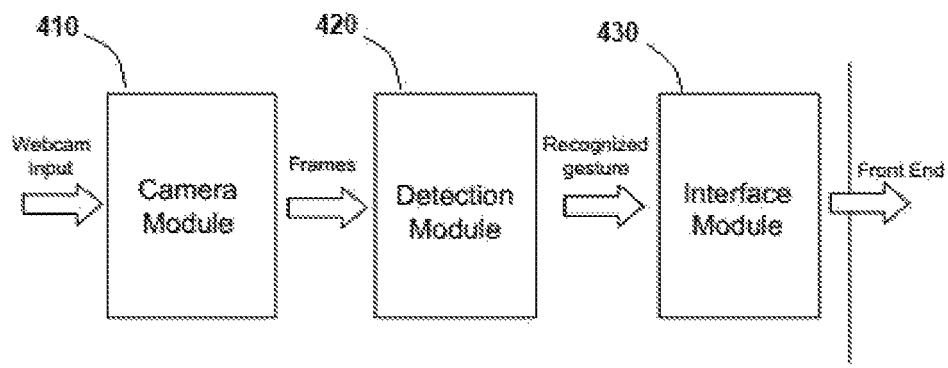
FIG. 4 shows a back end architecture of gesture detection subsystem of present computer implemented system.

FIG. 4 shows a back end architecture of gesture detection subsystem of present computer implemented system where the camera module 410 is an image detector which is any of USB based webcam or a device camera of smart user device that captures input images or videos and sends it to the detection module 420. The detection module 420 processes the images or video using pre-trained classified haar cascade data for image processing to detect a gesture. After reorganization of gesture, the interface module maps the detected gesture to their associated action and passes said action over the front end architecture for visualization.

Figure 5:
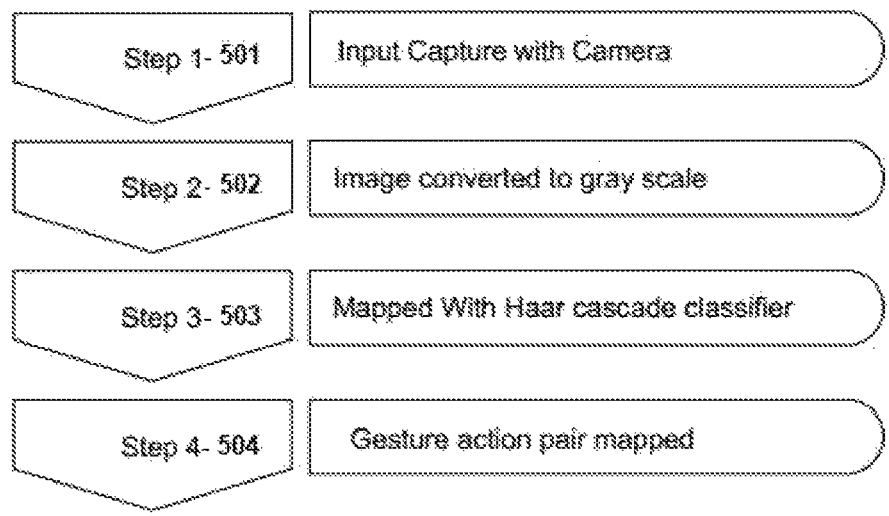
FIG. 5 shows process or method of working of gesture detection subsystem for gesture recognition.

Now referring to FIG. 5 which shows a process or method of working of gesture detection subsystem for gesture recognition. According to present embodiment, the method for gesture detection includes steps of: capturing input using the camera 501; conversion of detected image into a grey scale 502; mapping of said detected images using haar cascade classifier to determine a gesture 503; and pair mapping between the gesture and the action associated with said gesture 504.

Music Segmentation Subsystem

Figure 6:
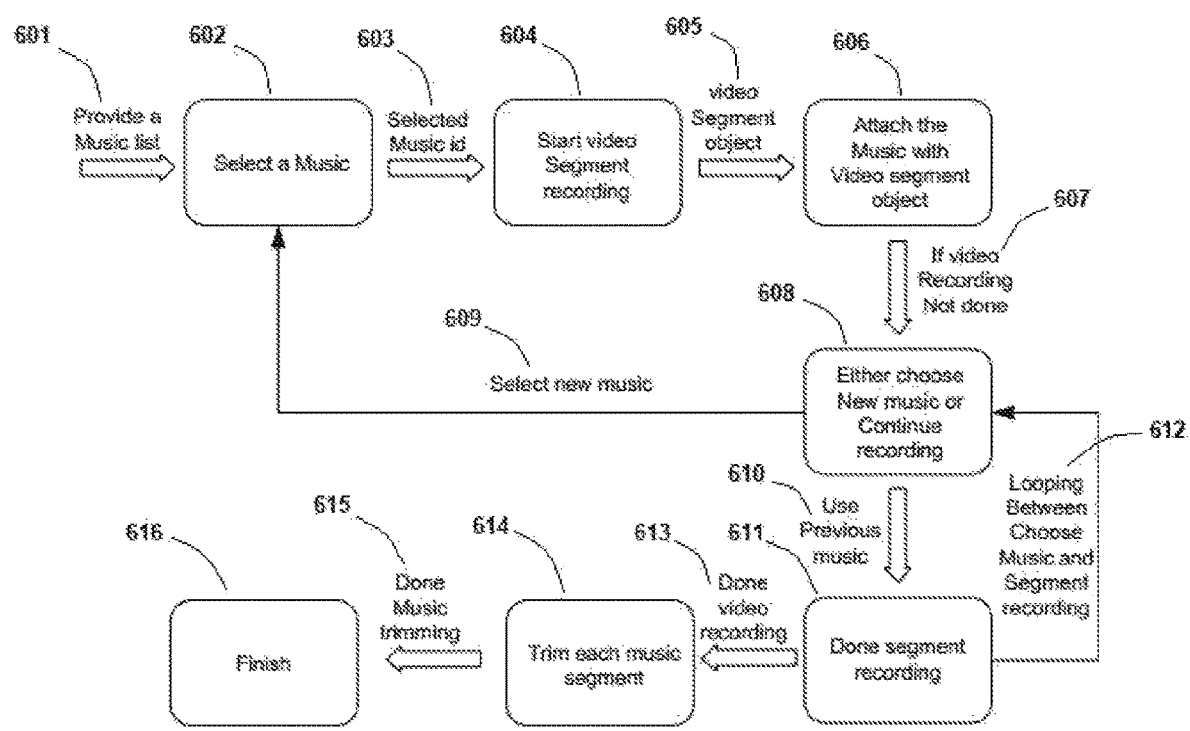
FIG. 6 shows process flow diagram of working of audio segmentation subsystem for creation of music segments using the computer implemented system of present invention.

The computer implemented system of present invention further provides a music segmentation subsystem for creation of music segments by trimming a created music video. Referring to FIG. 6 that shows process flow diagram to explain working of the audio segmentation subsystem for creation of music segments using the computer implemented system of present invention. The audio segmentation subsystem provides a list of a music 601 to the user to select any of the music from the list 602, the audio segmentation subsystem generates a music ID 603 for the music selected by the user; with selection of music 602 by the user, the audio segmentation subsystem initiates the camera of the smart user device for recording of video segment 604 and a video segment object 605. The audio segmentation subsystem then allows user to attach the music with the video segment object 606.

Further, if the video recording is not done 607, the subsystem provides user an options of, either choose new music or continue recording 608; if the user selects an option of select new music 609, the subsystem takes the user to a music list 601 and allows user to select a new music 602; else the subsystem continues the recording with the previous music, if the user selects 'use previous music' option 610 and continues the video segment recording 611. The subsystem provides looping 612 between music selection and video segment recording to allow user to create a video with multiple video segments having different music. Once a video is recorder 613, the audio segmentation sub-system allows the user to trim each music segment 614 and create a music segments by doing music trimming.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method of creation of videos with features of guessing, challenge, tracking or gesture detection using a multi-feature computer implemented system comprising steps of:

providing the first user to create a video using the camera of the smart user device and the computer implemented system;

allowing the first user to add music within the created video using the computer implemented system;

allowing the first user to select a segment of the video and select a filter on that selected segment;

allowing the first user to set the time and apply a tracking mechanism of the tracking subsystem;

the tracking mechanism of the tracking subsystem then analyzes audio rhythm of the selected segment and visualized said audio rhythm into the video wherein the computer implemented system is comprising of:

a guessing subsystem provided to allow a first user to create and share a video on a cross linked platform with a guessing question, an optional answers and a guessing time for other users of the cross linked platform to answer said guessing question while watching the video;

a challenge subsystem that facilitates the first user and the second user to create their videos using the computer implemented system, share said videos on any cross-linked platform, determines and announces winner based on the ratings given by other users of the platform after pre-defined time;

a tracking subsystem which is provided to determine a music effects applied in any segment of video and visualizing said music effect in said segment of video;

a gesture detection subsystem that is configured to record and determine gesture of the first user and preform an associated action with said gesture; and an audio segmentation subsystem that facilitates user with music trimming and allows to create a music segments by music trimming.

2. The method of creation of videos with features of guessing, challenge, tracking or gesture detection using a multi-feature computer implemented system of claim 1, wherein the gesture detection subsystem of present computer implemented system facilitates detection of gesture and performs an action associated with detected gesture, wherein the gesture subsystem is made of a front end architecture and a back end architecture, wherein the back end architecture is further comprising of:

a camera module that collects or records input video of the first user and sends it to a detection module;

the detection module processes the input video using pre-trained classified haar cascade classifier to detect a gesture of the first user from the input video and recognizes the gesture; and an interface module that maps the detected gesture with the associated action with that gesture and passes said action over the front end architecture of the gesture detection subsystem for visualization.

3. The method of creation of videos with features of guessing, challenge, tracking or gesture detection using a multi-feature computer implemented system of claim 1, wherein creation of music segments by music trimming using the music segmentation subsystem is comprising steps of:

allowing the first user to access the music segmentation subsystem and providing the first user with a list of music to select a music;

providing the first user to record a video segment using the camera of the smart user device;

allowing the first user to attach the selected music with the recorded music segment;

allowing the first user to choose another music and record another video segment with that another music in a loop to create a complete video; and allowing the first user to trim each music segment using the music segmentation subsystem.

4. The method of creation of videos with features of guessing, challenge, tracking or gesture detection using a multi-feature computer implemented system of claim 1, wherein the creation of video with guessing feature using the guessing subsystem of the computer implemented system is further comprising steps of:

allowing the first user to access the guessing subsystem by accessing the computer implemented system using a smart user device;

providing the first user a guessing button over the user interface of the smart device after accessing the guessing subsystem;

once the first user clicks on the guessing button, the guessing subsystem activates camera of the smart user device and initiates a video recording or creation;

allowing the first user to add a guessing question with guessing time and at least two answer as an option;

allowing the first user to share the video with guessing feature over any cross linked platform of the computer implemented system where the viewer may watch said video and answer said guessing question, thus play the guessing game while watching said video.

5. The method of creation of videos with features of guessing, challenge, tracking or gesture detection using a multi-feature computer implemented system of claim 1, wherein the challenge feature for video battle using the challenge subsystem of the computer implemented system is further comprising steps of:

allowing the first user to access the challenge subsystem and create a first video using the camera of smart user device and the computer implemented system;

allowing the first user to post the first video over any cross linked platform using the computer implemented system and tag a second user for challenge;

the computer implemented system then notifies the second user about the challenge and displays the first video over a home feed of the second user;

the computer implemented system allows the second user to accept the challenge, create the second video using the challenge subsystem and post said second video over the same cross linked platform using the computer implemented system;

providing viewers of said cross linked platform to watch the both the first video and second video and rate them; and based on viewer ratings, the computer implemented system decides and announces the winner over said cross linked platform.

* * * * *